United States Patent [19]

Ives et al.

[11] 4,195,669

[45] Apr. 1, 1980

[54] METHOD OF ARRESTING CRACK PROPAGATION IN LINE PIPE CHARACTERIZED BY DUCTILE FRACTURE

[75] Inventors: Kenneth D. Ives, Franklin Township, Westmoreland County; Raymond F. McCartney, Plum Borough; Alan K. Shoemaker, Monroeville Borough, all of Pa.

[73] Assignee: United States Steel Corporation, Pittsburgh, Pa.

[21] Appl. No.: 648,090

[22] Filed: Jan. 12, 1976

[51] Int. Cl.² .................... F16L 35/00; F16L 57/00
[52] U.S. Cl. .................................. 138/178; 138/103; 138/172
[58] Field of Search .................. 138/97, 99, 103, 106, 138/172, 174, 105, 148, 178; 29/421, 523

[56] References Cited

U.S. PATENT DOCUMENTS

| | | | |
|---|---|---|---|
| 366,457 | 7/1887 | Chenoweth | 138/105 X |
| 672,955 | 4/1901 | Murrin | 138/99 |
| 1,086,779 | 2/1914 | Miller | 138/105 |
| 1,308,072 | 7/1919 | Hessel | 138/105 X |
| 1,671,679 | 5/1928 | Marston | 61/1 R |
| 1,704,760 | 3/1929 | Parker | 138/99 |
| 1,733,455 | 10/1929 | Ferrond | 29/523 X |
| 1,763,360 | 6/1930 | Kean | 138/150 |
| 2,069,722 | 2/1937 | Merrill | 138/99 |
| 2,327,703 | 8/1943 | Freden | 29/523 X |
| 2,917,085 | 12/1959 | Douse | 138/97 |
| 3,096,105 | 7/1963 | Risley | 138/155 X |
| 3,349,807 | 10/1967 | Penman | 138/172 |
| 3,473,339 | 10/1969 | Schlafly | 138/105 X |
| 3,568,455 | 3/1971 | McLaughlin et al. | 138/105 X |
| 3,698,746 | 10/1972 | Loncaric | 138/155 X |
| 3,870,350 | 3/1975 | Loncaric | 138/155 X |

FOREIGN PATENT DOCUMENTS

| | | | |
|---|---|---|---|
| 1143155 | 1/1963 | Fed. Rep. of Germany | 138/105 |
| 2303922 | 8/1973 | Fed. Rep. of Germany | 138/174 |
| 1075463 | 7/1967 | United Kingdom | 264/45 |
| 1276468 | 6/1972 | United Kingdom | 138/103 |

*Primary Examiner*—Richard E. Aegerter
*Assistant Examiner*—James E. Bryant, III
*Attorney, Agent, or Firm*—Forest C. Sexton

[57] ABSTRACT

A method for arresting a propagating crack in a steel line pipe characterized by ductile or mixed mode fracture which involves providing a mass of material on or around the pipe which is sufficient to constrain or reduce the outward acceleration of the pipe walls behind the crack tip after the crack tip has propagated therepast.

3 Claims, 11 Drawing Figures

METHOD OF ARRESTING CRACK PROPAGATION IN LINE PIPE CHARACTERIZED BY DUCTILE FRACTURE

It has long been recognized that line pipe used to convey highly compressed fluids, may be susceptible to catastrophic crack propagation. Although such a line pipe will be designed to withstand the high internal pressures to which it will be subjected, a rupture may nevertheless result from outside causes, such as for example, the pipe may be pierced by a bulldozer blade. When such a rupture does occur in a line pipe subjected to high internal gas pressures, stresses in the pipe will be concentrated at the longitudinal ends of the rupture, often causing the rupture to crack further in the longitudinal directions. This cracking action, known as "crack propagation" may in fact progress at a rate of speed faster than the pressure drop rate along the line pipe length. Hence, such crack propagation can progress longitudinally along the pipe wall for hundreds of feet, and in some cases even miles of pipe have been cracked open.

In the case of conventional carbon steel line pipe subject to brittle fracture, it is not practical to design a pipe so heavy as to prevent the possibility of crack propagation. The most reasonable approach has been to incorporate crack arrestors in the line pipe, which do not prevent crack propagation, but rather confine it to a limited length of pipe. U.S. Pat. No. 3,349,807, Penman, describes a process for arresting such crack propagation and involves providing a crack arrestor at preselected intervals along the line pipe length. The crack arrestors are bands of material, such as a steel collar, tightly fitted around the pipe's circumference to provide sufficient inward compressive forces on the pipe wall as to counteract the outward forces of the compressed gas. Accordingly, a rupture initiated somewhere along the line pipe length may well progress in either or both directions until the advancing crack tip encounters a crack arrestor, i.e. that portion of the pipe wall subjected to inward forces, and will not progress therebeyond. Hence the crack propagation is limited to a distance no greater than the spacing between crack arrestors. It is essential however that the crack arrestors impose a very significant compressive force on the pipe wall, or else the crack can readily progress through the pipe wall beneath the arrestor as though it were not there.

In recent years the general approach in preventing crack propagation has been to use a much tougher pipe not subject to brittle fracture, and to specify fracture toughness sufficient to prevent crack propagation. More recent demand for line pipe of larger diameter and the desire to increase internal gas pressures has resulted in more stringent toughness requirements and greater production costs. In fact some pipeline operating conditions, particularly in Arctic applications, are so severe that it is not possible to make a line pipe tough enough to be immune to crack propagation. It is known therefore that for these proposed applications it may be necessary to incorporate crack arrestors even though exceptionally tough pipe is used. Unfortunately, this defeats one of the primary advantages of utilizing tough line pipe, as such crack arrestors are not readily attached under field conditions because of the excessive compressive forces the arrestors must apply onto the pipe wall.

This invention is predicated upon our development of a crack arrestor concept for arresting crack propagations in line pipe characterized by ductile fracture, or mixed mode fracture, i.e. fracture of both brittle and ductile characteristics. Although this concept is not applicable to carbon steel line pipe characterized by brittle fracture, it does nevertheless function suitably to arrest crack propagations of a ductile nature.

An object of this invention is to provide a method for limiting the extent to which a crack will propagate in a line pipe characterized by ductile or mixed mode fracture.

Another object of this invention is to provide a method of arresting a crack in a line pipe characterized by ductile or mixed mode fracture.

A further object of this invention is to provide a pipe line system of improved safety characteristics for conveying gas at super-atmospheric pressures.

Still another object of this invention is to provide crack arrestors of various designs for use on line pipe characterized by ductile or mixed mode fracture, which can readily be applied under field conditions.

In experimental work with some of the tougher line pipe steels, it has indeed been learned that despite their ductile fracture characteristics, such a line pipe can be subject to rather extensive crack propagation when subjected to severe operating conditions. A careful study of such fractures has revealed however that crack propagation phenomenon in these tough steels is not the same as that for steels subject to brittle fracture. Whereas the brittle fracture in carbon steel line pipe is accompanied by little or no plastic deformation, the ductile fracture in the tougher steels is associated with plastic deformation and attendant thinning of the pipe cross section in advance of the crack, which almost always progresses along the top of the pipe. Inasmuch as thinning of the pipe section does not preceed brittle fracture, very little displacement is necessary at the crack tip and the velocity of the crack propagation of a brittle fracture is usually high. Conversely, ductile fracture is preceeded by plastic deformation ahead of the crack tip, and therefore, crack propagation velocity is governed by the amount of thinning at the crack tip and the time required for the metal on each side of the crack to move the distance required to thin and fracture. Even so, ductile crack propagation in line pipe can proceed at velocities approaching 1000 feet per second.

It is known that arrest of either brittle or ductile fracture will occur when the crack propagates into a region of the pipe where the stresses drop to a diminutive level. The compressive crack arrestors of the prior art serve to cause such stress drop. We have learned however that because of the substantial displacement required at the crack tip for a ductile fracture to occur, the limitation of the crack tip displacement may also result in arrest of a ductile fracture. Therefore, the compliance of a structure, that is, its reaction to a change in loading, may affect ductile but not brittle fracture propagation.

Figure 1:
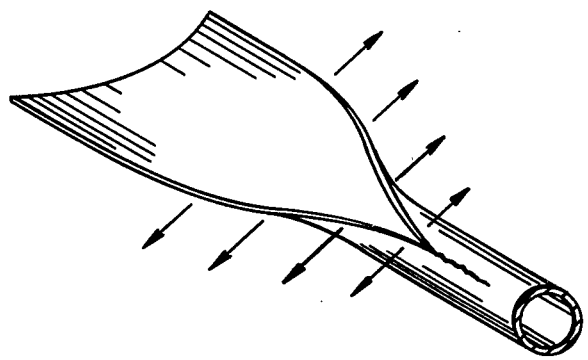
FIG. 1 is a perspective view of a line pipe section showing the nature of ductile crack propagation.

We have also found that the outward acceleration of the pipe flaps behind the crack tip provides the primary driving force to drive a ductile crack propagation. That is to say, because of the rather ductile nature of the pipe, once a fracture is initiated, the internal gas pressure forces cause the pipe flaps, i.e. the two portions of the pipe on either side of the crack, to be blown apart, sometimes literally flattening the pipe metal. As these flaps accelerate outwardly away from each other, they cause the crack tip to progress in advance thereof along the top surface of the pipe by a pulling action which tears the pipe open. Reference to FIG. 1 will graphically illustrate the phenomenon. The figure illustrates how a line pipe characterized by ductile fracture is literally ripped open by the acceleration of the pipe flaps. When such pipe is not below ground level, it can be literally flattened by such crack propagation as shown. Even below ground surface, there can be sufficient flap displacement and acceleration as to drive or cause such a crack to propagate for very long distances. Although it is apparent that the prior art crack arrestors could function to arrest a ductile fracture in much the same way as it does a brittle fracture, an understanding of the ductile fracture propagation as discussed above has led to the development of new and improved methods for arresting a ductile fracture, particularly methods which can be readily incorporated under field conditions.

Whereas prior art crack arrestor must impose very high compressive forces on the pipe wall to effectively arrest a brittle fracture, the ductile crack arrestors of this invention incorporate little or no such compressive forces. Rather the crux of this invention is to provide a crack arrestor which will limit the displacement and/or acceleration of one or both flaps once a crack starts propagating. Restriction or control of the flap displacement and/or acceleration will effectively arrest ductile crack propagation.

Figure 2:
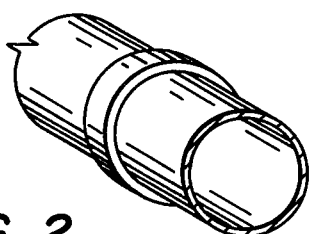
FIGS. 2 through 7 illustrate various crack arrestor designs according to this invention.
Figure 3:
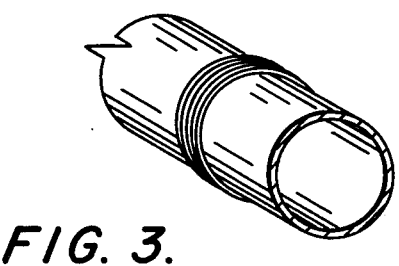
Figure 4:
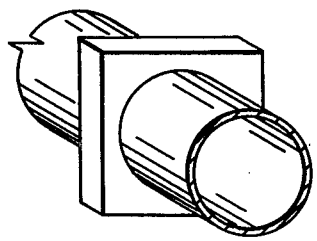

One such method of arresting a ductile crack propagation is to provide an encircling mass of material around the pipe, i.e. a circumferential constraint, at preselected intervals. Such a constraint may for example consist of a steel collar as shown in FIG. 2, or steel cable windings as shown in FIG. 3, or reinforced concrete cast around the pipe as shown in FIG. 4 or any other such circumferential constraint which will restrict the displacement of the pipe flaps. Although by all outward appearances, such crack arrestors may look very much like the prior art crack arrestors, the crack arrestors of this invention can be readily distinguished therefrom in that the circumferential constraint arrestors of this invention do not apply any significant compressive forces on the pipe surface. Indeed, the crack arrestors of this invention may even be loosely fit onto the pipe with a clearance at the interface as illustrated in FIGS. 8-11. All that is required of these crack arrestors is that they be strong enough to restrict pipe flap displacement thereunder and hence prevent acceleration thereof. Accordingly, should a ductile fracture result in a line pipe fitted with such crack arrestors and crack propagation result, the flap acceleration will advance the crack tip until it passes under and perhaps even beyond the crack arrestor. The crack arrestor will however prevent the flaps thereunder from being displaced and accelerated. Therefore, even though the crack tip may have advanced beyond the crack arrestors, the crack is quickly arrested because the primary driving force thereof is arrested, i.e. the outwardly accelerating pipe flaps.

Figure 5:
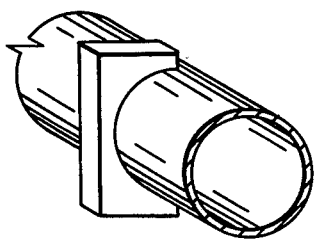
Figure 9:
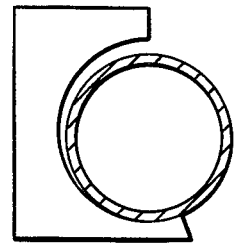
Figure 10:
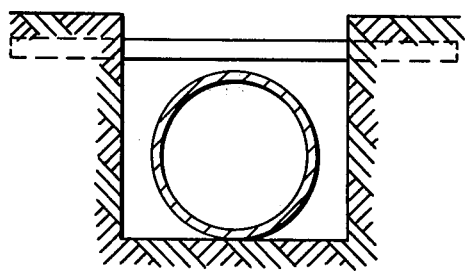
Figure 11:
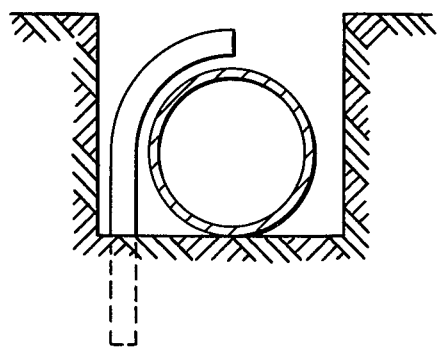

In the above described embodiment, arrest is effected by restricting displacement of both pipe flaps and hence preventing their acceleration. It should be noted however, that effective arrest can be achieved by other than an encircling constraint, for example masses of material which will prevent acceleration of the two flaps, or by restricting just one of the two flaps or by reducing acceleration in one of the two flaps. Reference to FIGS. 5, 9 and 11 will illustrate crack arrestor embodiments wherewith arrest is effected by restricting or constraining one flap only. By this method, where a mass of material is attached to only one side of the pipe, a ductile crack propagating along the pipe is arrested because of unsymmetrical radial displacement of the pipe flaps behind the crack. As a crack propagates along the pipe surfaces and past such an arrestor, the pipe flap on the unaltered side of the pipe will have a large displacement and acceleration, whereas the flap on the reinforced side will have little or no displacement and hence no acceleration. This will cause the crack tip to take a helical path around the pipe towards the unreinforced side, which quickly stops after about a 180° turn.

Figure 6:
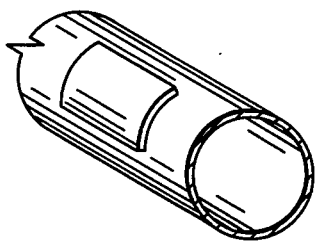
Figure 7:
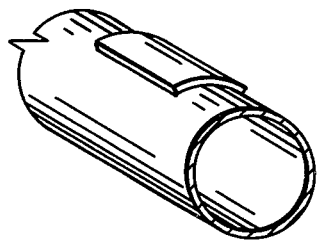
Figure 8:
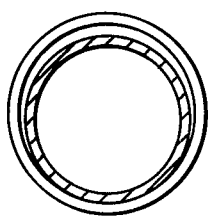
FIGS. 8 through 11 illustrate various other crack arrestor designs wherein the arrestor is not directly affixed to the line pipe.

In the embodiments described above, crack arrest is effected by limiting the displacement of one or both pipe flaps behind the crack tip, i.e. by providing a constraint. A third embodiment of this invention is to limit the acceleration of one or both pipe flaps, as distinguished from limiting their displacement. Inasmuch as the dynamics of motion of an element of mass in the fractured surface are governed by the physical law, $F = ma$, it becomes apparent that the acceleration, a, may be modified by changing either F, the resultant force on this element of mass, or m, the mass itself. The circumferential constraint described in the first embodiment provides a force to resist the forces of the pipe flap motion to thereby constrain the pipe flaps and prevent any acceleration thereof. In the second embodiment, arrest is effected by constraining just one of the flaps. Increasing the mass by attaching additional mass to the pipe wall, although not completely preventing acceleration as does the circumferential constraint, will nevertheless decrease acceleration. Decreased acceleration of an element of mass in the pipe flap automatically results in lower crack velocity, because it simply takes more time for the material to get out of the way of the running crack. Such a crack arrestor can take the form of additional mass rigidly affixed to the pipe wall in the form of contoured plates or strips as shown in FIG. 6 or a top cover plate as shown in FIG. 7. It is obvious of course that the added mass should be directly attached to the pipe wall for maximum effectiveness, and the mass should be sufficient enough to reduce the pipe flap acceleration to a level low enough to arrest crack propagation. The actual amount of mass necessary will of course vary depending upon pipe diameter, wall thickness, wall stiffness and internal gas pressure.

Although it might appear that there are three separate crack arrest concepts disclosed herein, it is clear that they are but three embodiments of one general concept. The general concept is that propagation of a ductile crack can be arrested if acceleration of at least one pipe flap behind the crack tip is reduced to a level insufficient to maintain the driving force which causes the crack to propagate. Adding mass to the pipe wall as last described above, will of course reduce pipe flap acceleration. Adding a circumferential constraint as per the first embodiment functions in much the same way except that instead of reducing acceleration, the constraint prevents any acceleration.

Another phenomenon we have observed is that of "ovaling". That is, as a crack tip propagates along a ductile pipe, the pipe tends to strain plastically in the lateral direction ahead of the advancing tip. A circumferential constraint as described above will restrict this straining, i.e. ovaling, and hence can thereby arrest the crack before it reaches the circumferential constraint.

It is further readily apparent that the six crack arrestor embodiments shown in the drawings are but a few of the many possible concepts that could be incorporated. Attaching mass for the sake of reducing pipe flap acceleration could take an almost infinite variety of forms, on either the outer or inner pipe surface, and on one or both sides of the pipe, i.e. one or both flaps. The circumferential constraint can also take many forms, which could even include reinforced plastic rings, or reinforced concrete cast around the line pipe. The nonuniform pipe flap acceleration to cause the crack tip to follow a helical path can even be effected by superdense back-fill on one side of the pipe. Since ductile fracture propagation almost always progresses along the top surface of the pipe, it is further obvious that any added mass to reduce pipe flap acceleration will be most effective if positioned accordingly, i.e. at or near the upper surface of the pipe so that after fracture, the additional mass is at or near the fractured edge of the pipe flap which is subject to the greatest acceleration. Obviously, added mass on the bottom surface of the pipe would not be as effectively reduced pipe flap acceleration.

We claim:

1. A method of arresting ductile fracture and mixed mode crack propagation in a steel line pipe containing gas at super-atmospheric pressures, wherein the fracture is propagated by the outward acceleration of pipe flaps behind the crack tip, the method comprising adding a close fitting untensioned annular body completely encircling the pipe such that when a crack tip advances therepast, the annular body constrains the pipe flaps thereby suitable preventing the outward acceleration thereof to a value insufficient to provide the necessary driving force to propagate the crack tip further.

2. A method according to claim 1 in which said annular body is provided by increasing the pipe wall thickness.

3. A method according to claim 1 in which said annular body comprises a steel cable wound around said pipe.

* * * * *

UNITED STATES PATENT AND TRADEMARK OFFICE
CERTIFICATE OF CORRECTION

PATENT NO. : 4,195,669

DATED : 4/1/80

INVENTOR(S) : Kenneth D. Ives, Raymond F. McCartney, and Alan K. Shoemaker

It is certified that error appears in the above–identified patent and that said Letters Patent are hereby corrected as shown below:

Column 5, line 10, delete "six".

Signed and Sealed this

Twenty-second Day of July 1980

[SEAL]

Attest:

SIDNEY A. DIAMOND

Attesting Officer

Commissioner of Patents and Trademarks